3,110,728
N-PHENYLACETYL-N'-ACYLUREAS

Hideji Takamatsu, Tsukaguchi, Amagasaki-shi, Hyogo-ken, Susumu Umemoto, Minamitadei-cho, Sakai-shi, Osaka, Seizaburo Kanoh, Takatsuki-shi, Osaka, and Takeshi Isozaki, Furuichi-Kita-Tori, Joto-ku, Osaka, Japan, assignors to Dainippon Pharmaceutical Co., Ltd., Osaka, Japan, a corporation of Japan
No Drawing. Filed July 20, 1961, Ser. No. 125,350
Claims priority, application Japan July 29, 1960
6 Claims. (Cl. 260—553)

This invention relates to NN'-diacylurea derivatives and processes for preparation thereof. More particularly, this invention relates to novel compounds, N-phenylacetyl-N'-acylurea derivatives having an anticonvulsant action being useful as medicinal drugs and processes for preparation thereof.

The research of an antiepileptic (anticonvulsant) was initiated from "phenobarbital" by Hauptman, A. (Münch. med. Wschr. 59, 1907 (1912)), in 1912 and many synthetic anticonvulsants have been found to date. Those compounds having anticonvulsant actions can be structurally classified into six types of barbiturates, hydantoins, dioxopyrimidines, oxazolidines, succinimides and ureas.

Those compounds of various types demonstrate characteristic spectrums respectively toward experimentally different convulsant seizures, the differences of anticonvulsant effects being recognized depending upon the methods of experiments.

Urea-type compounds, namely, acylurea derivatives generally correspond to hydantoin-type compounds whose rings open, said derivatives strongly antagonizing toward various convulsant agents and having so-called broad spectrums, which was recognized in the research by Swinyard, E. A. (Jap. Pharmacol. & Exp. Therap. 106, 319 (1952)).

With a view to finding a new urea-type compound having an excellent anticonvulsant action, at the same time, a sedative action of which compound of this type is expected, the present inventors have been synthesizing hundreds of compounds and examining the various pharmacological properties thereof. As a result, we have found that several new compounds out of N,N'-diacyl ureas especially such as one acyl radical thereof being a phenylacetyl radical or proper derivative thereof strongly resist against various convulsant agents as anticonvulsants, having a considerably weak toxicity as well as a slight tranquilizing action.

An object of this invention is to provide for novel useful compounds, N-phenylacetyl-N'-acylurea derivatives having an anticonvulsant action.

Another object of this invention is to provide for processes for preparing novel compounds, N-phenylacetyl-N'-acylurea derivatives.

A further object of this invention is to provide for an anticonvulsive preparation containing at least one kind of N-phenylacetyl-N'-acylurea derivatives as an effective component.

The above and other objects of this invention will be understood from the following description of this specification.

The structure of the novel compounds of this invention, N-phenylacetyl-N'-acylurea derivatives is represented by the following general Formula 1:

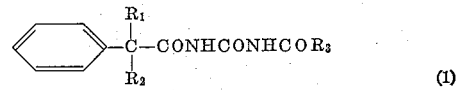

(1)

wherein $R_1$ is selected from the group consisting of hydrogen, aliphatic hydrocarbon radicals of 1–5 carbon atoms, phenyl radical and benzyl radical. $R_2$ is selected from the same group as $R_1$, or $R_1$ and $R_2$ taken together may be a polymethylene radical forming a ring. $R_3$ is selected from the group consisting of aliphatic hydrocarbon radicals of 1–5 carbon atoms, halo-substituted aliphatic hydrocarbon radicals of 1–5 carbon atoms, phenyl, radical and alkoxyphenyl radicals.

In the Formula 1, $R_1$, $R_2$ and $R_3$ can be alkyl radicals of 1–5 carbon atoms, namely, they can be methyl, ethyl, propyl, isopropyl, butyl, isobutyl, sec-butyl, tert-butyl, pentyl or isopentyl, etc. They also can be aliphatic unsaturated hydrocarbon radicals of 1–5 carbon atoms such as vinyl, allyl, propenyl, isopropenyl, butentyl, methaliyl or pentenyl. Further, in case of $R_3$, those aliphatic hydrocarbon radicals may be halo-substituted.

$R_1$ and $R_2$ taken together can be polymethylene radicals such as trimethylene, tetramethylene or pentamethylene radicals. In this case, a ring is formed containing a carbon atom attached to the phenyl radical as one member.

Also in the Formula 1, $R_3$ may be alkoxyphenyl radicals substituted by lower alkoxyl radicals such as methoxyl radical. For instance, $R_3$ may be trimethoxyphenyl radicals.

The preparing processes of N-phenylacetyl-N'-acylurea derivatives provided by this invention can be roughly divided into the following two.

(1) A process of reacting corresponding acylurea and acid halide or acid anhydride.

(2) A process for reacting corresponding acylisocyanate and acid amide.

In those two processes, one and only one of the reactants must contain phenylacetyl radicals or derivatives thereof. Accordingly, one process of this invention is shown in the reaction formula as follows.

(a) 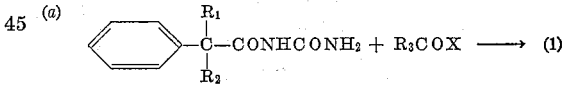 (1)

or $$(R_3CO)_2O$$

or

(b) $R_3CONHCOHN_2$ + or→ (1)

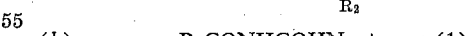

wherein $R_1$, $R_2$ and $R_3$ have the same meaning as in the Formula 1 and X represents halogen. This process is proceeded by heat reacting corresponding reactants selected respectively from acylurea derivatives and acid halides or acid anhydrides as shown in the above reaction Formula a or b. As to the amount to be used in this case, per 1 mol of acylurea, 1 mol of acid halide or acid anhydride may be used, however, the use of somewhat excess amount of said acid halide or acid anhydride is preferable. At this occasion, the combined use of a slight amount of reaction accelerator such as sulfuric acid or pyridine is preferable. Said reaction proceeds mildly at a reaction temperature of 40–100° C., preferably 50–60° C. and completes within a period from ½ to 2 hours. After the completion of the reaction, a transparent reaction solution is poured onto pieces of ice and the precipitated crystals are filtered. Said crystals can be purified by means of re-crystallization by the use of alcohol, etc. as a solvent.

The examples of N-phenylacetyl-N'-acylurea derivatives prepared by said first process are, for instance, as follows:

N-phenylacetyl-N'-acetylurea
N-phenylacetyl-N'-α-bromoisobutyroylurea
N-phenylacetyl-N'-α-bromoisovaleroylurea
N-α-methylphenylacetyl-N'-propionylurea
N-α-ethylphenylacetyl-N'-acetylurea
N-α-ethylphenylacetyl-N'-propionylurea
N-α-ethylphenylacetyl-N'-isobutyroylurea
N-α-ethylphenylacetyl-N'-butyroylurea
N-α-ethylphenylacetyl-N'-α-bromoisovaleroylurea
N-α-ethylphenylacetyl-N'-benzoylurea
N-α-ethylphenylacetyl-N'-3,4,5-trimethoxybenzoylurea
N-α-ethylphenylacetyl-N'-pivaloylurea
N-diphenylacetyl-N'-acetylurea
N-diphenylacetyl-N'-propionylurea
N-α,α-dimethylphenylacetyl-N'-propionylurea
N-α,α-diethylphenylacetyl-N'-acetylurea
N-α-ethyl-α-isopropyl-phenylacetyl-N'-propionylurea
N-α,α-ethylenephenylacetyl-N'-n-butyroylurea
N-α,α-tetramethylenephenylacetyl-N'-acetylurea
N-α,α-pentamethylenephenylacetyl-N'-acetylurea The other process of this invention is shown by the following reaction formula:

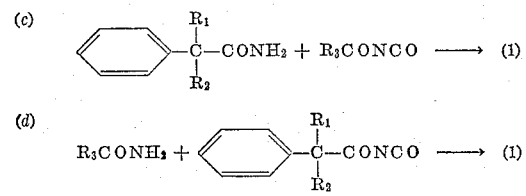

wherein $R_1$, $R_2$ and $R_3$ have the same meaning as in the Formula 1.

This process is proceeded by heat reacting corresponding reactants selected respectively from acylisocyanates and acid amides as shown in the above reaction Formula c or d in an anhydrous inert solvent such as petroleum ether, ether or benzene or without solvent. At this occasion, because an acylisocyanate is very unstable toward moisture, the reaction must be carried out after the moisture is sufficiently prevented from getting into the reaction system.

Usually, it is appropriate to use an equivalent mol of acid amide and acylisocyanate in the reaction. When an aliphatic isocyanate is used, an excess amount of isocyanate may be used. In that case, after the reaction, an excess amount of isocyanate can be separated from the object by either being distilled or becoming soluble after reacting with water or alcohol which is added thereto.

The reaction is usually carried out on a water bath for 2–10 hours by boiling with reflux at the boiling point of a solvent used or by warming at a temperature of 40–120° C. when no solvent is used. Even when the reaction contents are not homogeneous, when a part of the reaction solvent is taken, water is added thereto and when the occurrence of carbon dioxide decreases, it becomes the evidence of the completion of the reaction. After the completion of the reaction, the solvent is either distilled off or decanted and the compound which is the object of the reaction is taken out. The product thus obtained can be purified by means of re-crystallization by the use of alcohol etc. as a solvent.

The examples of N-phenylacetyl-N'-acylurea derivatives prepared by said second process are, for instance, as follows:

N-phenylacetyl-N'-acetylurea
N-phenylacetyl-N'-propionylurea
N-phenylacetyl-N'-α-bromoisovaleroylurea
N-α-methylphenylacetyl-N'-acetylurea
N-α-methylphenylacetyl-N'-n-butyrolurea
N-α-ethylphenylacetyl-N'-acetylurea
N-α-ethylphenylacetyl-N'-propionylurea
N-α-ethylphenylacetyl-N'-isobutyroylurea
N-α-ethylphenylacetyl-N'-α-bromoisobutyroylurea
N-α-ethylphenylacetyl-N'-benzoylurea
N-α-ethylphenylacetyl-N'-3,4,5-trimethoxybenzoylurea
N-α-ethylphenylacetyl-N'-pivaloylurea
N-α-ethylphenylacetyl-N'-acryloylurea
N-diphenylacetyl-N'-acetylurea
N-diphenylacetyl-N'-propionylurea
N-α,α-dimethylphenylacetyl-N'-acetylurea
N-α,α-dimethylphenylacetyl-N'-n-butyroylurea
N-α-methyl-α-ethyl-phenylacetyl-N'-acetylurea
N-α-α-diethylphenylacetyl-N'-acetylurea
N-α-ethyl-α-n-propyl-phenylacetyl-N'-propionylurea
N-α-ethyl-α-isopropyl-phenylacetyl-N'-n-valeroylurea
N-α-ethyl-α-n-butyl-phenylacetyl-N'-n-butyroylurea
N-α-ethyl-α-isobutyl-phenylacetyl-N'-isovaleroylurea
N-α-ethyl-α-allyl-phenylacetyl-N'-acetylurea
N-α-ethyl-α-benzyl-phenylacetyl-N'-acetylurea
N-α-ethyl-α-n-butyl-phenylacetyl-N'-acetylurea
N-α-ethyl-α-n-butyl-phenylacetyl-N'-acetylurea
N-α,α-ethylenephenylacetyl-N'-propionylurea
N-α,α-tetramethylenephenylacetyl-N'-acetylurea
N-α,α-pentamethylenephenylacetyl-N'-acetylurea As was described so far, many compounds of the N-phenylacetyl-N'-acylurea derivatives can be prepared by both of the above-mentioned two processes.

More detailed examples with reference to several N-phenylacetyl-N'-acylurea derivatives are described hereinbelow. It should be understood, however, that those examples are for the explanatory purpose of this invention and not the restriction thereof in any sense.

EXAMPLE 1

*N-α-Ethylphenylacetyl-N'-Acetylurea*

5 grams of α-ethylphenylacetylurea were added to 12 cc. of acetic acid anhydride with stirring, the mixture was warmed a little, and 1 gram of concentrated sulfuric acid was dropped thereinto. After the reaction was carried out for 1 hour, the reactant was thrown into ice water, the precipitated crystals were filtered and the filtered crystals were re-crystallized by the use of diluted alcohol.

The object, N-α-ethylphenylacetyl-N'-acetylurea, was obtained in the state of white needle crystals. The yield was 5 grams, the melting point thereof being 100–101° C.

EXAMPLE 2

*N-α-Ethylphenylacetyl-N'-Acetylurea*

5 grams of α-ethylphenylacetamide were added to 20 cc. of petroleum ether not containing water, 7 grams of acetylisocyanate were added thereto, and the mixture was refluxed for about 5 hours. After the solvent was distilled off, the residue was washed with water. When the reactant was re-crystallized by the use of diluted alcohol, the object, N-α-ethylphenylacetyl-N'-acetylurea in the state of white needle crystals was obtained. The yield was 5 grams, the melting point thereof being 100–101° C.

EXAMPLE 3

N-α-Ethylphenylacetyl-N'-Acetylurea

To 2.5 grams of acetamide, 20 cc. of ether not containing water were added, 5 grams of α-ethylphenylacetylisocyanate were added thereto and the mixture was heated with reflux for about 7 hours, thereafter said mixture was treated in exactly the same process as that in Example 2. The object, N-α-ethylphenylacetyl-N'-acetylurea in the state of white needle crystals, was obtained. The yield was 5 grams, the melting point thereof being 100–101° C.

EXAMPLE 4

N-α-Ethylphenylacetyl-N'-Propionylurea

To 5 grams of α-ethylphenylacetylurea were added 5 grams of pyridine and 15 grams of propionic acid chloride, after the mixture was heated on a water bath for 1.5 hours, the heated mixture was concentrated, when the residue was re-crystallized by the use of diluted alcohol, the object, N-α-ethylphenylacetyl-N'-propionylurea in the state of white needle crystals, was obtained. The yield was 2 grams, the melting point thereof being 103–105° C.

EXAMPLE 5

N-Phenylacetyl-N'-Bromoisovaleroylurea

To 5 grams of α-bromoisovaleroylurea were added 20 grams of phenyl acetic acid anhydride, the mixture was warmed to 50–60° C., a few drops of concentrated sulfuric acid were added thereto with stirring, and the mixture was heated on a boiled water bath for 2 hours.

After the heated mixture was cooled, the precipitated crystals were filteerd, said crystals were washed with diluted solution of sodium carbonate and re-crystallized by the use of diluted alcohol, and the object, N-phenylacetyl-N'-α-bromoisovaleroylurea in the state of white needle crystals was obtained. The yield was 2 grams, the melting point thereof being 88–90° C.

EXAMPLE 6

N-α-Ethylphenylacetyl-N'-3,4,5-Trimethoxybenzoylurea 5 grams of 3,4,5-trimethoxybenzamide were suspended in 20 cc. of ether not containing water, 5 grams of α-ethylphenylisocyanate were added thereto, the mixture was heated with reflux for about 7 hours. After said heated mixture was cooled, the precipitated object was filtered, the filtered object was re-crystallized by the use of alcohol and N-α-ethylphenylacetyl-N'-3,4,5,-trimethoxybenzoylurea in the state of white needle crystals was obtained. The yield was 3 grams, the melting point thereof being 170–172° C.

EXAMPLE 7

N-α,α-Tetramethylenephenylacetyl-N'-Acetylurea 18.9 grams of α,α-tetramethylenephenylacetamide and 10.8 grams of acetylisocyanate were boiled with reflux in 50 cc. of petroleum ether not containing water on a water bath for 8 hours. After the petroleum ether was distilled off, the residue was re-crystallized by the use of ethanol, the objective N-α,α-tetramethylenephenylacetyl-N'-acetylurea was obtained in the state of white needle crystals. The yield was 22 grams, the melting point thereof being 167–169° C.

EXAMPLE 8

N-α,α-Pentamethylenephenylacetyl-N'-Acetylurea 20.3 grams of α,α-pentamethylene-phenylacetamide and 10.8 grams of acetylisocyanate were boiled with reflux in 50 cc. of anhydrous ether on a water bath for 5 hours, the precipitated crystals of the object were filtered, the filtered crystals were re-crystallized by the use of ethanol and N-α,α-pentamethylenephenylacetyl-N'-acetylurea was obtained in the state of white needle crystals. The yield was 15 grams, the melting point thereof being 166–167° C.

Other compounds according to this invention can be prepared same as in each of the above-mentioned examples, however, several examples are demonstrated in the following Table 1.

TABLE 1

| Example No. | Compound | Melting point (° C.) |
|---|---|---|
| 9 | N-α,α-diethylphenylacetyl-N'-acetylurea | 140–142 |
| 10 | N-α-ethylphenylacetyl-N'-benzoylurea | 184–185 |
| 11 | N-α-ethylphenylacetyl-N'-isobutyroylurea | 119–122 |
| 12 | N-α-ethyl-α-benzylphenylacetyl-N'-acetylurea | 172–174 |
| 13 | N-α-ethyl-α-allylphenylacetyl-N'-acetylurea | 136–138 |
| 14 | N-phenylacetyl-N'-acetylurea | 106–107 |
| 15 | N-α-ethylphenylacetyl-N'-pivaloylurea | 135–136 |
| 16 | N-α-ethylphenylacetyl-N'-acroylurea | 124–125 |
| 17 | N-diphenylacetyl-N'-acetylurea | 168–169 |
| 18 | N-α-methyl-phenylacetyl-N'-acetylurea | 129–131 |
| 19 | N-α-ethyl-α-n-butylphenylacetyl-N'-acetylurea | 138–140 |

The novel compounds N-phenylacetyl-N'-acylurea derivatives of this invention have an anticonvulsant action and are useful as medicinal drugs, as shown in the following Table 2.

TABLE 2

| Compounds | Toxicity LD$_{50}$ (mice i.p.), mg./kg. | Pharmacological properties | | |
|---|---|---|---|---|
| | | Anti-electro-shock effect | Anti-pentyl-enete-trazole effect | Prolongation of hexo-barbital sleep |
| N-α-ethylphenylacetyl-N'-acetylurea | 380 | +++ | +++ | +++ |
| N-α-ethylphenylacetyl-N'-propionylurea | 570 | +++ | +++ | +++ |
| N-α-ethylphenylacetyl-N'-pivaloylurea | 542 | +++ | ++ | ++ |
| N-α,α-pentamethylene-phenlacetyl-N'-acetylurea | 1,283 | +++ | + | +++ |
| N-phenylacetyl-N'-acetylurea | 871 | +++ | ++ | + |
| N-α,α-diethylphenylacetyl-N'-acetylurea | 490 | +++ | +++ | +++ |
| N-α,α-tetramethylene-phenylacetyl-N'-acetylurea | 818 | +++ | + | + |
| N-α-ethyl-α-allylphenyl-acetyl-N'-acetylurea | 650 | ++ | +++ | ++ |
| N-phenylacetyl-N'-α-bromo-isovaleroylurea | 605 | + | +++ | + |

NOTE.—Wherein animals used are dd-type mice, the marks +++, ++ and + express respectively excellent, good and fair.

Further, an outline of its pharmacological properties will be described with reference to N-α-ethylphenylacetyl-N'-acetylurea.

The LD$_{50}$ of this drug is 380 mg./kg. (mouse, i.p. (intraperitoneal)), 695 mg./kg. (mouse, p.o. (per os)); 490 mg./kg. (rat, i.p.), 1,133 mg./kg. (rat, p.o.). The toxicity of this drug is of medium degree and when a massive dosis thereof is administered, ataxia is resulted. When a dosage of about 50% PD$_{50}$ is administered, due to the potentiation of the methylhexabital, this drug is shown to have a central sedative action. In the experiment of a cat's spinal reflex, an inhibition of reflex is observed by the i.v. (intravenous) of above 20 mg./kg. Said action is weaker than that of meprobamate. Toward a preparation of skeletal muscle of a rat, this drug scarcely shows any direct action and is considered to have a tranquilizing action via at least 2 neurons. On the other hand, the anticonvulsant action of this drug is at least equal to that of other control drugs. This drug antagonizes well to pentylenetetrazole, strychnine, etc. and the duration thereof is continuous. As regards the anti-electro-shock action of this drug, its strength is next to that of diphenylhydantoin and the onset of said action is very fast. Toward an electro-shock, the duration of this drug is continuous and this drug is superior to phenacemide and meprobamate, etc.

In short, as regards the pharmacological properties of this drug, its effect as an anti-epileptic (anticonvulsant)

is broad spectrum, on the other hand this drug has also a slight tranquilizing action, accordingly, this may well be called a novel drug having concurrently the respective characteristics of phenaceamide, meprobamate and diphenylhydantoin.

This drug can be used in the forms of a usual tablet, powder or 1–5% syrup.

A part of clinical data by the use of this drug is shown in the following Table 3.

TABLE 3

| No. | Sex | Age | Type of seizure | Maximal dosis (grams) | Period (days) | Effect | Side effect |
|---|---|---|---|---|---|---|---|
| 1 | ♂ | 29 | G.M. | 1.2 | 72 | +++ | none. |
| 2 | ♂ | 12 | Local convulsion (M₂e). | 1.2 | 90 | +++ | slight eruption. |
| 3 | ♀ | 9 | G.M. | 1.2 | 120 | ++ | none. |
| 4 | ♀ | 8 | G.M. | 1.2 | 90 | ++ | none. |
| 5 | ♂ | 15 | Ps. M. | 1.2 | 51 | ++ | none. |
| 6 | ♂ | 12 | G.M. | 0.8 | 120 | + | none. |
| 7 | ♂ | 20 | Headache fit. | 0.8 | 120 | ± | none. |

Annotation:
1. Diphenylhydantoin and phenobarbital had been deemed ineffective to those patients in the above table.
2. G.M.: Grand Mal; Ps. M.: Psychomator seizure.
3. +++: excellent; ++: good; +: fair; ±: indetermined.

We claim:
1. A compound of the formula

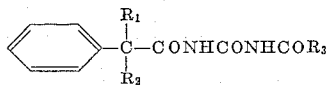

wherein $R_1$ and $R_2$ are each selected from the group consisting of hydrogen, alkyl of 1 to 5 carbon atoms, allyl, phenyl and benzyl; and $R_1$ and $R_2$ when taken together is a polymethylene ring of 4 to 6 carbon atoms; $R_3$ is selected from the group consisting of alkyl of 1 to 5 carbon atoms, vinyl, bromosubstituted alkyl of 1 to 5 carbon atoms, phenyl and methoxyphenyl.

2. N-α-ethylphenylacetyl-N'-acetylurea.
3. N-α-ethylphenylacetyl-N'-propionylurea.
4. N-α-ethylphenylacetyl-N'-pivaloylurea.
5. N-α,α-pentamethylenephenylacetyl-N'-acetylurea.
6. N-phenylacetyl-N'-acetylurea.

References Cited in the file of this patent

Stoughton: J. Org. Chem., vol. 2 (March 1937–January 1938), pages 514–21.

Kaufmann et al.: Berichte, vol. 75 (1942), pages 1233–34.

Simons: Fluorine Chemistry, vol. 1 (1950), page 402.

Everett et al.: J. Pharacol. and Exptl. Therap., vol. 106 (1952), pages 303–13 at pages 303 and 311.